Patented Jan. 17, 1950

2,494,636

UNITED STATES PATENT OFFICE 2,494,636

EMMENTHALER CHEESE

James Bryan Stine, Chicago, Ill., assignor to Kraft Foods Company, Chicago, Ill., a corporation of Delaware No Drawing. Application June 15, 1946, Serial No. 677,083

4 Claims. (Cl. 99—116)

The Emmenthaler type of cheese or process originated in Switzerland, and the cheese of that type made in the United States is, for that reason, generally called "Swiss" cheese. For the purpose of this case, a cheese of the Swiss type is considered to be a cheese made by the Emmenthaler or Swiss process, which comprises the following steps:

1. Inoculate cow's milk with a culture of such type or types of bacteria as are suitable for producing a cheese having the characteristic nutty flavor of "Swiss" cheese.

2. Set or coagulate the milk, usually at a temperature of between 85° and 95° F.

3. Cut the curd.

4. Stir the cut curd in the whey, preferably at a temperature of about 120° F. to 138° F.

5. Separate the curd from the whey.

6. Press the curd in a form for some hours to eliminate more whey and to knit or consolidate the curd.

7. Soak the body of curd in brine for a short time, e. g. 1 to 4 days, at a relatively low temperature, for example 50° to 60° F.

8. Allow the body to drain and store in a cool room, for example 50° to 60° F., for a short time, e. g. 4 to 15 days.

9. Store the body in a warm room, for example 65° F. to 80° F. for 2 to 6 weeks, during which time the body cures, i. e. gases are developed in the body by bacterial action, usually resulting in the formation of cells or "eyes" within the body, the volume of the body expanding during the curing period because of the formation of such cells within the body structure.

According to the usual procedure heretofore practiced in making natural cheese by the Swiss process, the making operation has been effected in round-bottom vats or kettles, each holding about 2,500 lbs. or more of milk, all of the curd from a single batch or kettleful of milk being used to make a single body of cheese in the form of a disk or wheel about 3 feet in diameter and 8 inches thick and weighing from 160 to 220 lbs. When the curd is drained, it is placed in a wheel-shaped form in which it is subjected to heavy pressure overnight, after which the body of consolidated curd is removed from the form before it enters the brine tank.

In a good average specimen of domestic wheel Swiss cheese, the expansion in volume during curing is quite large due to the formation of a profusion of relatively large eyes or cells in the body or structure of the cheese, as a result of which the wheel, which originally had a reasonably clear-cut cylindrical shape, becomes rounded on all surfaces and thereby loses its original sharp cylindrical outline. Usually the bodies of cheese are turned or reversed from time to time during the curing process, as a result of which both top and bottom surfaces of the cheese become equally rounded.

During the initial stages of the curing process, the exterior of the wheel or body of cheese made according to the customary Swiss cheese process develops some mold growth, which is removed by washing with salt water. Throughout the entire curing period the wheels are salted and turned over about twice a week. This washing and turning is a disagreeable operation, and also, because of the great weight of these individual wheels of cheese, the turning and handling of the wheels is a laborious process involving the expenditure of great physical effort on the part of the cheese maker.

In the Swiss cheese industry, it has come to be generally accepted that the characteristic nutty flavor associated with the Swiss or Emmenthaler type of cheese will not be possessed by cheese having poor eye or cell formation, and, in normal times, it is difficult to sell, except at a discount, cheese of the Swiss type which has few or small eyes. Also, it has come to be generally accepted that, in order to produce Swiss cheese having the eye formation required for good flavor, it is necessary to make the cheese in the large units or wheels as above described.

Whenever it has been necessary, because of an insufficient milk supply, to make units of Swiss cheese in smaller units such as more or less rectangular blocks, the resulting cheese has had poor eye formation, in many cases totally without eyes or "blind," and the flavor has been quite unsatisfactory. Consequently, for many years, natural Swiss cheese (except "process" Swiss) has had to be made and marketed in the large wheel-shape, notwithstanding the many practical difficulties or inconveniences resulting from the handling and distribution of such large merchantable units.

It has also been the firm belief of most practical Swiss cheese makers that, in order to insure the development of proper eyes, it is necessary that the cheese, during the curing operation, should develop a strong, tough structure or "body," otherwise the cheese will not cure properly, and the eyes will not develop sufficiently, and furthermore that this strong, tough body or structure cannot be obtained if the original milk contains too high a percentage of fat. In fact, it is the regular practice among Swiss cheese makers to reduce the normal Holstein cow's milk fat content of about 3.4 or 3.5 to about 3.0%, by separating part of the cream before the milk is put into the kettle.

A yield of finished cured cheese made from 10,000 lbs. of cow's milk standardized to contain 3.1% of fat is about 775 lbs. which will analyze about as follows:

Milk fat 26% to 29% (average 27½%) of the total weight of cheese.
Water 38 to 40% (average 39%).

I have discovered an improvement upon the established Swiss cheese procedure which will enable the cheese maker to produce large or small units of cheese of quality at least equal to, and in some cases materially superior to, that of wheel Swiss made in the customary manner, and those units may be made in any shape or size desired by the trade for convenient distribution and marketing to any size of retail outlet. Furthermore, I am able to obtain this result when using as a raw material cow's milk having a materially higher fat content than has heretofore been thought possible. This in turn enables the cheese maker to produce considerably more cheese of a higher fat content and of less moisture content than cheese produced by the old wheel Swiss process. For example, from 10,000 lbs. of milk produced in the area around Milledgeville, Illinois, and containing 3.5% of fat, I can produce 925 lbs. of Swiss-type cheese of superior flavor having an analysis substantially as follows:

Milk fat 32 to 35% (average 33½%) of the total weight of cheese.
Moisture 36 to 38% (average 37%).

Thus, on this basis, it will be seen that when my improved process is used with high fat milk it will produce, as compared with the conventional Swiss cheese process, 150 lbs. more cheese per 10,000 lbs. of milk, representing an increased yield of $150/775$ or over 19%. Furthermore, my improved cheese when made from high fat milk will contain $6/27$ or over 21% more fat than is contained in the conventional Swiss cheese made from 3.1% fat and will contain $2/39$ or 5.1% less water.

It is true that, using a low fat or partly separated milk according to the customary established Swiss cheese process, some income is derived from the separated cream, but with my process such loss of by-product income is much more than compensated for by the largely increased yield of salable cheese. The fact is that, by using my improvement in the making of Swiss cheese from a higher fat milk, the cost of manufacture per pound is somewhat less than in the case of wheel Swiss, the cheese is of superior flavor, it is more nutritious because it contains more fat and less water than regular wheel Swiss, and it is more convenient for sale because it is not only made in much smaller uits, but those units can be made in the rectangular form without sacrifice of flavor or cell structure.

The following is a description of my improved process, it being understood that the details of the procedure followed may be varied to suit individual conditions and preferences, the following description being that of the process as successfully practiced in producing merchantable block cheese of the Swiss type at Milledgeville, Illinois, in the winter of the year 1945 to 1946.

The milk analyzed about 3.5% of milk fat. None of the fat was separated from the milk, but, before it entered the vat, it may have been first pasteurized in a flash plate pasteurizer held at a temperature of 158° to 162° F. for about 17 seconds. This temperature produces a phosphatase-negative milk.

The vat used was a copper Swiss cheese kettle of a rather shallow type exactly the same as was used in the regular wheel Swiss process. About 1,800 to 1,900 lbs. of milk were introduced into the vat, and at the time the milk entered the vat, the acidity was normal. The filling of the vat took about 5 minutes, and the milk was vigorously stirred during that time.

When the kettle was full, there was added to the milk in addition to rennet the usual amounts of the usual cultures for example:

1. *Lacto-bacillus bulgaricus*
2. *Streptococcus thermophilus*
3. *Propionibacterium* shermani The temperature was then raised to 88° to 92° F., stirring meanwhile, and the stirring was continued for 2 or 3 minutes longer and then discontinued. The setting of the curd took place after the usual interval, and at the end of about 30 minutes the curd was ready for cutting.

The cutting of the curd was effected with the usual Swiss harp, and the contents of the vat were stirred with the harp for about 10 minutes, after which the power stirrers were attached, and the stirring was continued for an equal length of time.

Thereafter the curd was alternately stirred and allowed to settle for periods of 10 minutes each until about 1 hour had elapsed from the time that the curd was cut. The vat was then heated, and the temperature raised to about 128° to 130° F., which took about 35 minutes during all of which time the contents of the vat were vigorously stirred wtih a power stirrer. When the desired temperature was reached, the vat was held at that temperature, and the stirring was continued for about ¾ of an hour. The curd was then allowed to settle, and then netted or dipped out of the kettle in a single mass by means of the usual rectangular net cloth.

Up to this point, except for the fact that the milk had a fat content of 3.5%, there was no substantial variation from the regular Swiss cheese process used for making wheel Swiss.

After the curd was netted or dipped from the vat in a single mass in the usual manner, it was allowed to drain and then the mass in the cloth was placed in a form, preferably rectangular and of sufficient capacity to hold the entire mass of curd. For example, the form may be about 32 inches long, 20 inches wide and 8 inches deep. This will hold about 180 to 190 lbs. of curd. The form rested upon a loose bottom or base, and the cloth was folded over the top of the curd and then covered by a substantial wooden lid, held down by a weight of about 50 lbs. placed on top of the lid. After about 5 minutes, during which time the whey continued to be expelled from the curd, the lid was removed, the form was removed, the original cloth was folded back, and then a new cloth was put over the top of the block of curd, after which the wooden form was replaced. The assembly was then reversed, and the old cloth removed. The new cloth was folded back over the top, the lid replaced, and the 50 lb. weight replaced on the lid.

Under these conditions, the block of curd was pressed for about 2 hours during all of which time whey drained out of the curd. The last operations were then repeated with a clean dry cloth, and pressure under the 50 lb. weight repeated for another 2 hours. A third new dry cloth was then applied, as above described, and the body or block of curd was then left in the form under 50 lbs. pressure overnight. It was not put under the regular wheel press.

In the morning, the weight, lid, form and cloth were removed, and the soft block placed into another rectangular form of the same size as the original form and having about 3 slats across the bottom, so that it will support the block. The block in the slat bottom form was then put into the brine tank which contained a saturated solution of ordinary sodium chloride. The brine tank temperature was held at about 50 to 55° F. The assembly remained in the tank for about 1 day, after which the outer form was removed. At this point, the block of curd can be divided into halves, i. e. 16 by 20 inches, quarters, i. e. 8 inches by 20 inches, or any smaller sizes desired. These blocks were then put back into the brine tank for about 2 days, turning them about twice a day as is usual in the brining of wheel Swiss. The blocks were then removed from the brine tank and put on carrying boards and allowed to stay in the holding room (held at about 50° to 55° F.) for about 4 days until dry.

The outside surfaces of the blocks were then sealed. This may be effected in different ways. The preferred procedure has been by dipping the blocks into a kettle of a fluid mineral wax melting at about 150° F. consisting of an amorphous wax, or a combination of paraffin wax and amorphous wax.

Another method of sealing the outside surfaces of the block is to apply a wrap of elastic-flexible material such as cellophane, the inner surface of which may be coated with a layer of suitable wax which is similarly flexible and elastic.

It will be understood that whatever type of wax or other material is used for sealing the outside of the block of curd, the sealing material must necessarily have sufficient flexibility or elasticity, or both, to enable the block to expand in volume during the curing operation without fracturing the seal.

These sealed blocks were then kept in the holding room for from 6 to 8 days. At the beginning or end of this period they were put into confining forms just large enough to enable the blocks to be comfortably inserted therein. These forms preferably have bottoms and lids, and upon the lid may be placed a small weight of the order of 10 lbs. per sq. ft. of lid area, it being understood that the lid is of such size as to fit freely within the form on top of the cheese or body when the latter is placed in the form. Preferably, the form is somewhat deeper than the thickness of the block, so that, although expansion of the block is permitted, the block will still be contained within the form at the conclusion of the curing period.

The rectangular forms may be lined with waxed chip board such as is used for making butter cartons, the waxed side of the chip board being placed in contact with the sealed surface of the block.

The forms containing the bodies or blocks of cheese to be cured were then taken into the warm or curing room, which was maintained at the same temperature which is employed in the usual wheel Swiss cheese process, for example 74° to 76° F. During the period of 25 days, which is occupied in the curing, the forms need not be handled at all. There is no need to wash, salt, or turn over the blocks from time to time, as in the case of the usual wheel Swiss process.

The cheese can then be removed from the rigid wooden forms and sold immediately. However, in order to develop a superior flavor, it is advisable to hold the blocks of cheese at a temperature of about 50° F. for from 30 to 90 days.

Because of the reduction in handling in the curing room, the labor cost for producing rectangular block cheese in accordance with my improved process is no more, in fact less, than in the case of the wheel Swiss process, in addition to which the cheese in the block form is free from rind and mold or other disagreeable surface characteristics. Furthermore, the eyes are found to be fully and satisfactorily developed throughout the body of the cheese, whereas, in the case of the wheel Swiss, in the outer layer of the wheel, the eyes are either very small or few in number or are non-existent.

In the light of present information, I believe that the novel and patentable features of the invention are set forth in the following claims.

I claim:

1. The improvement in the art of making a body of natural cheese of the Swiss type which comprises applying a coat of extensible, flexible, fluid-proof sealing material to the exterior surface of the uncured body to seal the surface of said body prior to eye development in a warm room, and curing the sealed body in the warm room while confining the body under controlled pressure within an expandable mold, said mold expanding during the curing operation under the internal pressure generated within said body by the curing process.

2. The improvement in the art of making a body of natural cheese of the Swiss type, which comprises sealing the exterior surface of the uncured body prior to eye development in a warm room, enclosing the sealed body in a mold of such capacity that the body volume increase caused by the development of eyes within the body will cause the body to snugly fill said mold, and placing the enclosed, sealed body in the warm room to effect the development of eyes.

3. The improvement in the art of making a body of natural cheese of the Swiss type, which comprises applying a coat of flexible, fluid-proof, sealing material to the exterior surface of the uncured body prior to eye development in a warm room, enclosing the sealed body in a mold of such capacity that the body volume increase caused by the development of eyes will cause the body to snugly fill said mold, and placing the enclosed, sealed body in the warm room to effect the development of eyes.

4. The improvement in the art of making a body of natural cheese of the Swiss type from cow's milk containing about 3.5% of fat, which comprises sealing the exterior surface of the uncured body prior to eye development in a warm room, enclosing the sealed body in a mold of such capacity that the body volume increase caused by the development of eyes within the body will cause the body to snugly fill said mold, and placing the enclosed, sealed body in the warm room to effect the development of eyes.

JAMES BRYAN STINE.

(References on following page)

REFERENCES CITED

The following references are of record in the file of this patent:

UNITED STATES PATENTS

| Number | Name | Date |
|---|---|---|
| 1,334,693 | Doane | Mar. 23, 1920 |
| 1,449,390 | Matheson | July 1, 1924 |
| 2,018,637 | Doane | Oct. 22, 1935 |
| 2,361,749 | Davis | Oct. 31, 1944 |
| 2,400,390 | Clunan | May 14, 1946 |
| 2,402,605 | Cowen | June 25, 1946 |
| 2,424,693 | Jones | July 29, 1947 |

FOREIGN PATENTS

| Number | Country | Date |
|---|---|---|
| 374,732 | Canada | Jan. 14, 1937 |

OTHER REFERENCES

Bulletin 608, Bureau of Animal Industry, U. S. Department of Agriculture; published by U. S. Government Printing Office Mar. 6, 1918; pages 19 and 20.

"The Making of Processed Cheese," by H. H. Sommer et al., published by Agr. Exp. Station of the University of Wisconsin, Madison Research Bulletin 137, June 1939, pages 4, 5, and 19 to 23.